Oct. 12, 1943.    R. A. W. SPOONER    2,331,851
COUPLING OR ENGAGING DEVICE
Filed Dec. 31, 1942
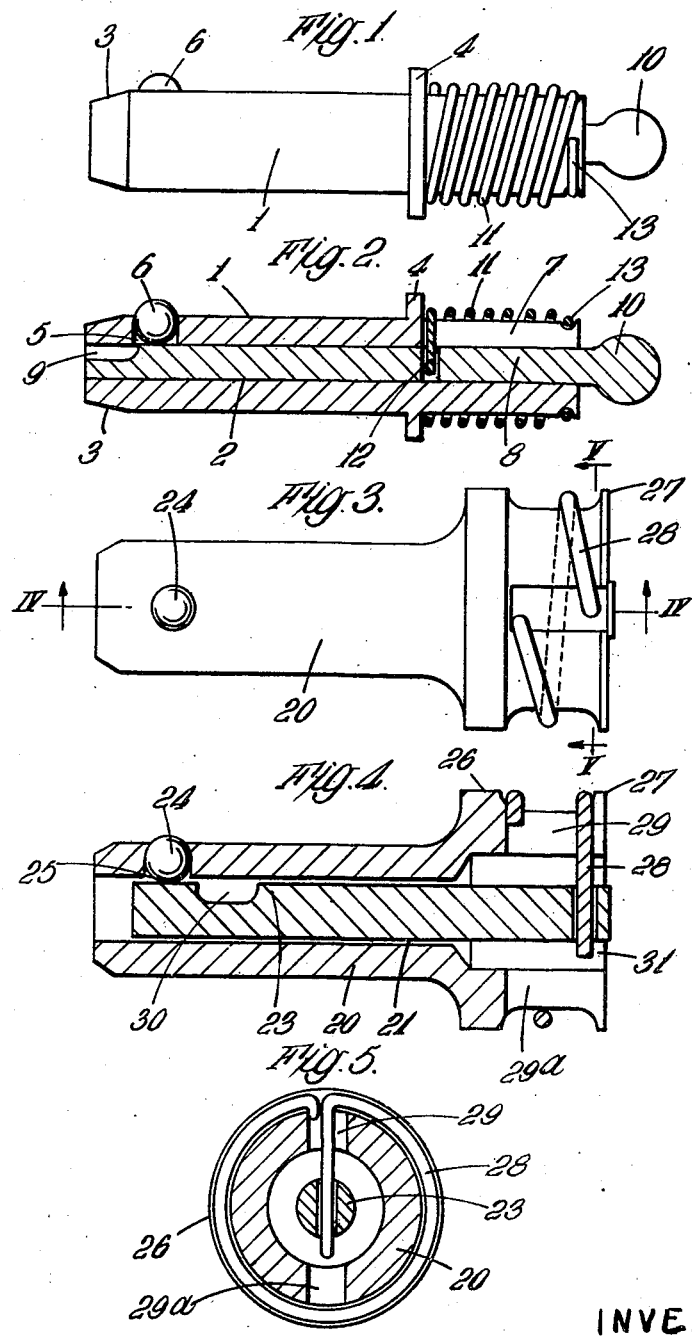
INVENTOR
REGINALD ARTHUR WILLIAM SPOONER
BY Hornidge & Dowd
ATTORNEYS Patented Oct. 12, 1943

2,331,851

UNITED STATES PATENT OFFICE 2,331,851

COUPLING OR ENGAGING DEVICE

Reginald Arthur William Spooner, Walton-on-Thames, England

Application December 31, 1942, Serial No. 470,745

5 Claims. (Cl. 85—5)

This invention relates to devices for pinning articles together so that they can be quickly released.

In the specification of my British Patent No. 524,297 I have described and claimed one such device consisting essentially of a headed tubular member in which a rod subjected to the action of a spring is mounted to slide. One or more radially movable members normally stand protruded from the tubular member to form an axial abutment or abutments, but movement of the rod against the spring allows the movable members to move radially inwards so that they cease to form abutments. When the rod is in this position the device can be pushed through registering apertures in two articles to be joined together until the head makes contact with the wall of the first aperture; on the release of the rod, the spring moves the rod axially within the tubular member to force the radially movable member or members into their operative or abutment position, so that they engage behind the wall of the furthermost aperture. In the device shown in the drawings of my said British patent the spring is a helical spring accommodated inside the head of the device, the internal diameter of which is greater than that of the remainder of the bore of the tubular member.

An object of the present invention is to simplify the construction and cheapen the device.

Another object of the invention is to enable the device to be removed by a single pull.

A further object of the invention is to enable the device to be turned easily so as to loosen it if it should become wedged in position.

Yet another object of the invention is to shape the device so that it cannot easily be removed by any unauthorised person.

The manner in which these objects are attained will best be understood from the following description of the devices made according to my present invention, when read in conjunction with the annexed drawing, in which:

Fig. 1 is an elevation of one device;

Fig. 2 is a longitudinal section through this device;

Fig. 3 is an elevation of the second device; and

Figs. 4 and 5 are sections on the lines IV—IV and V—V respectively in Fig. 3.

The device shown in Figs. 1 and 2 comprises a tubular member 1 having a bore 2 of uniform diameter throughout and being externally tapered at 3 to facilitate its insertion in use. A rod 8 is axially movable in the bore 2 and is formed with an operating knob 10. A ball 6 is mounted to move in a radial bore 5 in the member 1, the outer lip of this bore being turned over to prevent the ball escaping completely. In the position shown in the drawing, the ball is forced by the rod 8 to stand protruded from the tubular member 1 and so constitutes an axial abutment.

A helical spring 11 surrounds the head end of the tubular member 1. The end coil 13 of this spring lies in a groove formed on the end of the member 1 and the other end 12 of the spring passes radially inwards through an axial slot 7 in the member 1 and into a diametrical bore in the rod 8, being thus anchored to the rod. Normally, as shown in the drawing, the inner end coil of the spring bears against an abutment formed by a collar 4 integral with the member 1, but when the rod is pulled to the right the spring moves with it and is compressed.

When the rod is thus pulled outwards from the tubular member, a cut-away part 9 comes opposite to the ball 6, so that the ball is free to move radially inwardly until it no longer projects from the surface of the tubular member. The device can then be pushed through registering apertures in two or more parts to be joined together, for instance two metal sheets. The left-hand face of the collar 4 constitutes an axial abutment on the near side of the parts to be joined together, and when the rod is released and is restored by the spring the ball 6 constitutes a similar abutment on the far side.

It will be observed that as the spring 11 is arranged outside the tubular member 1 the bore can be made uniform throughout. This materially simplifies and cheapens the construction. A further advantage is that if the device should become wedged in position it may often be freed simply by turning the rod (which must in any case be moved axially to release the device), because as the tubular member and rod are interconnected by the spring the two will turn together. Moreover, unless the device is wedged in position all that is necessary to release it is to grip the knob 10 and pull. Then the rod 8 first moves to the right and thereafter the whole device. This simplifies and speeds up the operation.

It will be understood that, if desired, the device can be operated by pushing the rod inwards instead of pulling it outwards if the slot or cut-away part 9 is made at a point to the right of the ball 6 (as seen in Fig. 2) instead of at the end, and the outer end of the spring is anchored in the rod. Again, instead of making a slot in the rod, the latter may be formed with an inclined wall along which the ball may slide when the rod moves. There may be two or more balls, each movable in a radial bore, instead of only one. Yet again, if it is desired to save the loss of metal by turning, the collar 4 may be a separate ring swaged or brazed in position on the member 1.

In the modified construction shown in Figs. 3 to 5, there is a tubular member 20 with a radial bore 25 containing a ball 24 and a rod 23 is arranged to slide in the bore 21 in the member 20. This rod is actuated by push action instead of pull action, and it is formed with a cut-away part 30 at a little distance from its end accordingly. The head of the tubular member is enlarged and it has two flanges 26 and 27 and opposed axial slots 29 and 29a. A helical spring 28 surrounds the head end of the tubular member, one end of the spring passing through the slot 29 and being anchored in the rod 23. The bore 31 within the head of the tubular member is larger than that within the body. It will be observed that this device cannot conveniently be manually operated, and it is therefore not likely to be unintentionally released by tampering. To operate it, either a screw-driver may be used to force the rod to the left, the slots 29 and 29a allowing the blade of the screwdriver to enter the device, or a circular tool may be introduced into the bore 31. A screw-driver may be used to perform the double purpose of moving the rod axially and turning it.

What I claim is:

1. In a device for pinning articles together, a tubular member formed with a slot and at least one radial opening, a rod axially movable in said tubular member, at least one member radially movable in said tubular member and forced in one position of the rod to project from said radial opening in said tubular member whereby to constitute an axial abutment, said radially movable member being permitted to move inwards in another position of said rod, a spring arranged outside said tubular member and engaging said rod through said slot in said tubular member, and axial abutment means rigid with said tubular member.

2. In a device for pinning articles together, a tubular member having a bore of uniform diameter throughout and formed with a slot and at least one radial opening, a rod axially movable in said tubular member, at least one member radially movable in said tubular member and forced in one position of the rod to project from said radial opening in said tubular member whereby to constitute an axial abutment, said radially movable member being permitted to move inwards in another position of said rod, a spring arranged outside said tubular member and engaging said rod through said slot in said tubular member, and axial abutment means rigid with said tubular member.

3. In a device for pinning articles together, a tubular member formed with a slot and at least one radial opening, a rod axially movable in said tubular member, at least one member radially movable in said tubular member and forced in one position of the rod to project from said radial opening in said tubular member whereby to constitute an axial abutment, said radially movable member being permitted to move inwards in another position of the rod, a spring arranged outside said tubular member and engaging said rod through said slot in said tubular member, and a flange on said tubular member forming on one face an abutment for said spring and on the other face an axial abutment opposed to that formed by said radially movable member.

4. In a device for pinning articles together, a tubular member formed with a slot and at least one radial opening, a rod lying wholly within and axially movable in said tubular member, at least one member radially movable in said tubular member and forced in one position of the rod to project from said radial opening in said tubular member whereby to constitute an axial abutment, said radially movable member being permitted to move inwards in another position of said rod, a spring arranged outside said tubular member and engaging said rod through said slot in said tubular member, and axial abutment means rigid with said tubular member, said rod being operable by a tool.

5. In a device for pinning articles together, a tubular member formed with two diametrically opposed slots and at least one radial opening, a rod lying wholly within and axially movable in said tubular member, at least one member radially moveable in said tubular member and forced in one position of the rod to project from said radial opening in said tubular member whereby to constitute an axial abutment, said radially movable member being permitted to move inwards in another position of said rod, a spring arranged outside said tubular member and engaging said rod through one of said slots in said tubular member, and axial abutment means rigid with said tubular member, said rod being operable by a screw-driver through said slots.

REGINALD ARTHUR WILLIAM SPOONER.